(12) United States Patent
Joshi et al.

(10) Patent No.: US 9,589,156 B2
(45) Date of Patent: *Mar. 7, 2017

(54) SYSTEM AND METHOD FOR INTERCEPT OF UEFI BLOCK I/O PROTOCOL SERVICES FOR BIOS BASED HARD DRIVE ENCRYPTION SUPPORT

(71) Applicant: Dell Products L.P., Round Rock, TX (US)

(72) Inventors: Anand Prakash Joshi, Round Rock, TX (US); Richard M. Tonry, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,256

(22) Filed: Nov. 4, 2015

(65) Prior Publication Data

US 2016/0070655 A1 Mar. 10, 2016

Related U.S. Application Data

(63) Continuation of application No. 13/905,200, filed on May 30, 2013, now Pat. No. 9,208,105.

(51) Int. Cl.
*G06F 21/78* (2013.01)
*G06F 12/14* (2006.01)
(Continued)

(52) U.S. Cl.
CPC .......... *G06F 21/78* (2013.01); *G06F 12/1408* (2013.01); *G06F 21/575* (2013.01);
(Continued)

(58) Field of Classification Search
CPC .......... G06F 21/71; G06F 21/78; G06F 21/82; G06F 21/85; G06F 21/575; G06F 21/1408
(Continued)

(56) References Cited

U.S. PATENT DOCUMENTS 5,787,491 A * 7/1998 Merkin ................. G06F 3/0605
711/173
6,148,382 A * 11/2000 Bitner ................. G06F 11/1471
711/159

(Continued)

*Primary Examiner* — Hadi Armouche
*Assistant Examiner* — Shahriar Zarrineh
(74) *Attorney, Agent, or Firm* — Isidore PLLC

(57) ABSTRACT

An information handling system and method performs Unified Extensible Firmware Interface (UEFI) interception and pre-processing of data associated with block input/output (I/O) commands targeting encrypted storage devices. A UEFI interceptor block (IB) I/O driver intercepts each block I/O command targeting block addresses on a storage device and identifies whether any of the target block addresses is encrypted. In response to identifying an encrypted block address among the target block addresses, the UEFI IB I/O driver forwards data associated with the encrypted block address to an encryption-decryption module to perform one of an encryption and a decryption of the data. Final handling of the block I/O command is performed using a block I/O driver chained to the UEFI IB I/O driver. Data associated with I/O commands targeting encrypted block addresses is first processed by the encryption-decryption module before final handling of the I/O command is performed by the block I/O driver.

19 Claims, 5 Drawing Sheets

(51) Int. Cl.
  *G06F 21/72* (2013.01)
  *G06F 21/57* (2013.01)
  *G06F 21/82* (2013.01)
  G06F 21/85 (2013.01)
  G06F 21/10 (2013.01)
  H04L 9/08 (2006.01)
  G06F 21/71 (2013.01)
  H04L 29/06 (2006.01)

(52) U.S. Cl.
  CPC ............ *G06F 21/72* (2013.01); *G06F 21/82* (2013.01); *G06F 21/10* (2013.01); *G06F 21/71* (2013.01); *G06F 21/85* (2013.01); *G06F 2212/1052* (2013.01); *H04L 9/08* (2013.01); *H04L 63/0428* (2013.01)

(58) Field of Classification Search
  USPC ........................................................ 713/189
  See application file for complete search history.

(56) References Cited

U.S. PATENT DOCUMENTS

| | | | | |
|---|---|---|---|---|
| 6,519,762 B1* | 2/2003 | Colligan | ............... | G06F 21/80 714/E11.133 |
| 6,584,518 B1* | 6/2003 | Bass | ............... | G06F 12/023 370/230 |
| 7,325,109 B1* | 1/2008 | Muppalaneni | ...... | G06F 11/2082 707/999.104 |
| 7,512,719 B1* | 3/2009 | Gillespie | ............ | G06F 12/0284 710/10 |
| 7,818,586 B2* | 10/2010 | Witt | ............... | G06F 21/602 713/193 |
| 8,036,377 B1* | 10/2011 | Poo | ............... | H04L 9/0631 380/28 |
| 8,266,449 B2* | 9/2012 | Challener | ............. | H04L 9/3226 711/114 |
| 8,370,648 B1* | 2/2013 | Natanzon | ............. | H04L 63/068 380/277 |
| 8,458,491 B1* | 6/2013 | Powell | ............... | G06F 21/60 713/190 |
| 8,555,015 B2* | 10/2013 | Muchsel | ............... | G06F 21/71 711/163 |
| 8,566,574 B2* | 10/2013 | Shriver | ............... | G06F 21/575 713/189 |
| 8,793,796 B2* | 7/2014 | Panasyuk | ............. | G06F 21/575 380/277 |
| 8,798,262 B1* | 8/2014 | Raizen | ............... | G06F 21/78 380/277 |
| 8,806,143 B1* | 8/2014 | Cheng | ............... | G06F 3/0611 707/799 |
| 9,195,832 B1* | 11/2015 | Rusakov | ............... | G06F 21/575 |
| 9,430,330 B1* | 8/2016 | Bardhan | ............ | G06F 11/1448 |
| 2003/0014653 A1* | 1/2003 | Moller | ............... | G06F 21/572 713/193 |
| 2003/0188178 A1* | 10/2003 | Strongin | ............ | G06F 12/1408 713/193 |
| 2004/0268106 A1* | 12/2004 | Holmberg | ............... | G06F 8/65 713/1 |
| 2005/0013441 A1* | 1/2005 | Klein | ............... | G06F 21/6218 380/278 |
| 2005/0050342 A1* | 3/2005 | Boivie | ............... | G06F 21/80 713/193 |
| 2005/0091491 A1* | 4/2005 | Lee | ............... | G06F 21/10 713/167 |
| 2007/0005815 A1* | 1/2007 | Boyd | ............... | G06F 3/0619 710/2 |
| 2007/0168284 A1* | 7/2007 | Factor | ............... | G06F 21/6218 705/50 |
| 2008/0005476 A1 | 1/2008 | Venkatesan et al. | | |
| 2008/0082835 A1* | 4/2008 | Asher | ............... | G06F 21/78 713/193 |
| 2008/0148388 A1* | 6/2008 | Wooten | ............... | G06F 21/34 726/17 |
| 2008/0301467 A1* | 12/2008 | Saito | ............... | G06F 12/1408 713/190 |
| 2009/0150631 A1* | 6/2009 | Wilsey | ............... | G06F 12/1408 711/163 |
| 2009/0259798 A1* | 10/2009 | Wang | ............... | G06F 3/0607 711/103 |
| 2009/0319806 A1* | 12/2009 | Smith | ............... | G06F 21/575 713/193 |
| 2009/0327758 A1* | 12/2009 | Sakanaka | ............. | G06F 3/0623 713/193 |
| 2010/0017796 A1* | 1/2010 | Walker | ............... | G06F 9/4411 717/174 |
| 2010/0030999 A1* | 2/2010 | Hinz | ............... | G06F 12/0246 711/206 |
| 2010/0049906 A1* | 2/2010 | Tao | ............... | G06F 12/1408 711/103 |
| 2010/0106954 A1* | 4/2010 | Muchsel | ............... | G06F 21/71 713/2 |
| 2010/0131773 A1* | 5/2010 | Cherian | ............... | G06F 21/64 713/193 |
| 2010/0229004 A1* | 9/2010 | Asnaashari | ............. | G06F 21/78 713/193 |
| 2010/0332846 A1* | 12/2010 | Bowden | ............ | G06F 17/30097 713/189 |
| 2011/0022853 A1* | 1/2011 | Donie | ............... | G06F 21/78 713/190 |
| 2011/0072276 A1 | 3/2011 | Lee et al. | | |
| 2011/0138166 A1* | 6/2011 | Peszek | ............... | G06F 21/575 713/2 |
| 2011/0145016 A1* | 6/2011 | Eshraghian | ......... | G06F 21/6245 705/3 |
| 2011/0145609 A1* | 6/2011 | Berard | ............... | G06F 1/3203 713/320 |
| 2011/0252223 A1 | 10/2011 | Zimmer et al. | | |
| 2012/0036347 A1* | 2/2012 | Swanson | ............... | G06F 21/79 713/2 |
| 2013/0013934 A1* | 1/2013 | King | ............... | G06F 21/79 713/190 |
| 2013/0117503 A1* | 5/2013 | Nellans | ............... | G06F 12/0246 711/103 |
| 2013/0205067 A1* | 8/2013 | Kettner | ............... | G06F 3/061 711/103 |
| 2013/0275691 A1* | 10/2013 | Chew | ............... | G06F 12/00 711/154 |
| 2013/0276091 A1* | 10/2013 | Saxena | ............... | H04L 63/029 726/11 |
| 2014/0025947 A1* | 1/2014 | Jaber | ............... | G06F 21/572 713/164 |
| 2014/0059293 A1* | 2/2014 | Bisht | ............... | G06F 12/0848 711/113 |
| 2014/0189336 A1* | 7/2014 | Ballesteros | ........... | G06F 21/575 713/2 |
| 2014/0237205 A1* | 8/2014 | Takefman | ............. | H03M 13/05 711/162 |
| 2014/0258700 A1* | 9/2014 | England | ............... | G06F 21/572 713/2 |
| 2014/0281577 A1* | 9/2014 | Nicholes | ............. | G06F 21/71 713/189 |
| 2014/0351571 A1* | 11/2014 | Jacobs | ............... | G06F 21/575 713/2 |

* cited by examiner

SYSTEM AND METHOD FOR INTERCEPT OF UEFI BLOCK I/O PROTOCOL SERVICES FOR BIOS BASED HARD DRIVE ENCRYPTION SUPPORT

PRIORITY CLAIM

The present application is a continuation of and claims priority to U.S. patent application Ser. No. 13/905,200, titled "SYSTEM AND METHOD FOR INTERCEPT OF UEFI BLOCK I/O PROTOCOL SERVICES FOR BIOS BASED HARD DRIVE ENCRYPTION SUPPORT", filed on May 30, 2013.

BACKGROUND

1. Technical Field

This disclosure relates generally to information handling systems, and more particularly to managing input/output (IO) transactions in Unified Extensible Firmware Interface (UEFI)-based environments.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSes are typically configured to power on using a traditional basic input/output system (BIOS) or using a more conventional Unified Extensible Firmware Interface (UEFI) protocol. These firmware modules perform initializations of system devices, including installation of a standard block input/output (I/O) protocol that performs disk access without regard to whether a targeted block address is encrypted or not. However, access to encrypted data under the traditional use of BIOS is not practical and/or supported for systems that implement the UEFI protocol.

BRIEF SUMMARY

Disclosed is an information handling system and a method that perform Unified Extensible Firmware Interface (UEFI) interception and pre-processing of data associated with block input/output (I/O) commands that targets a partially or fully encrypted storage device. Generally, the concepts extend to performing Unified Extensible Firmware Interface (UEFI) block input/output (I/O) access to storage devices that can be encrypted.

According to one aspect, the method provides for handling encryption associated with hard drive access using a Unified Extensible Firmware Interface (UEFI) block input/output (I/O) protocol. A UEFI interceptor block I/O driver intercepts a block I/O command sent to a block I/O driver by a caller to access one or more target block addresses on a storage device. The UEFI interceptor block I/O driver identifies whether any of the one or more target block addresses on the storage device is encrypted. In response to identifying an encrypted block address among the one or more target block addresses, the UEFI interceptor block I/O driver forwards the I/O data associated with the encrypted target block address to an encryption-decryption module to perform one of an encryption (for write data processing) and a decryption (for read data processing) of the I/O data. The UEFI interceptor block I/O driver uses the block I/O driver to perform final handling (e.g., delivery of data) of the block I/O command. The I/O data stored within the encrypted block address targeted by the block I/O command is first identified by the UEFI interceptor block I/O driver and processed by the encryption-decryption module before the final processing of the block I/O command is performed by the block I/O driver. The I/O data stored within the encrypted target block address(es) is first identified by the UEFI interceptor block I/O driver and processed by the encryption-decryption module before final handling of the block I/O command is performed by the block I/O driver.

Another aspect of the disclosure involves an information handling system that handles encryption associated with hard drive access using a UEFI interceptor block I/O driver and a separate encryption-decryption module. The IHS includes: a storage device; a memory device; a processor communicatively coupled to the storage device and the memory device; an encryption-decryption module accessible to the processor; and a block input/output (I/O) driver maintained on the memory device and which can execute on the processor. The IHS also includes a Unified Extensible Firmware Interface (UEFI) that executes on the processor and which includes a UEFI interceptor block I/O driver that performs some of the aforementioned method processes and/or configures the processor to perform each of the aforementioned method processes.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DETAILED DESCRIPTION

Figure 1:
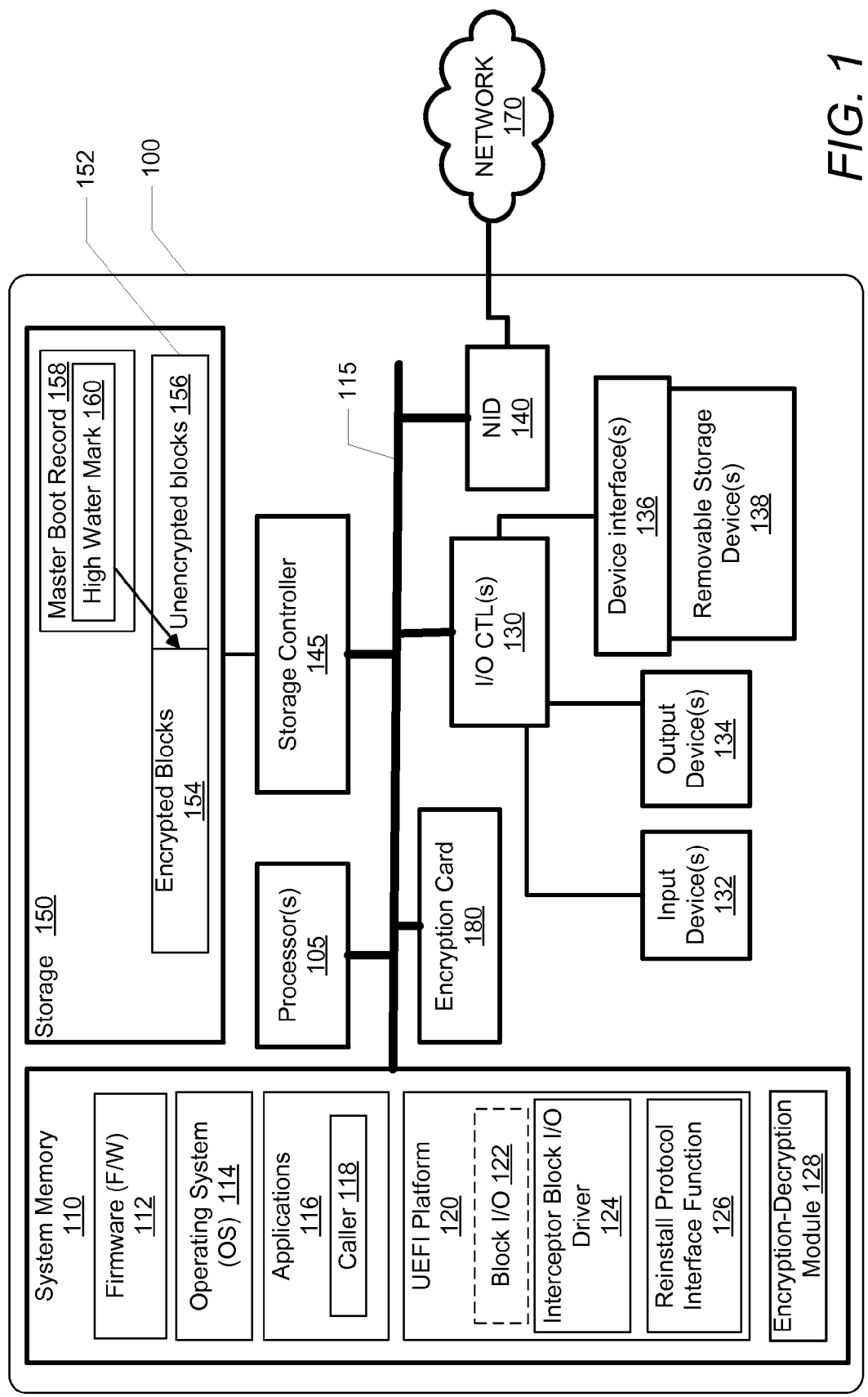
FIG. 1 illustrates an example information handling system within which various aspects of the disclosure can be implemented, according to one or more embodiments.

The described embodiments of the disclosure provide an information handling system and method that perform Unified Extensible Firmware Interface (UEFI) interception and pre-processing of data associated with block input/output (I/O) commands that targets a partially or fully encrypted storage device. A UEFI interceptor block I/O driver intercepts a block I/O command for I/O access to target block addresses on a storage device and identifies whether any of the target block addresses is encrypted. In response to identifying an encrypted block address among the target block addresses, the UEFI interceptor block I/O driver forwards data associated with the encrypted block address to an encryption-decryption module to perform one of an encryption and a decryption of the data. Final handling of the block I/O command is performed using a block I/O driver chained to the UEFI interceptor block I/O driver. Accordingly, data associated with I/O commands targeting encrypted block addresses is first processed by the encryption-decryption module before final handling of the I/O command is performed by the block I/O driver.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

One development in computer system architecture/operation has been the advent of computer system hard drive storage encryption technology by which all or a portion of a storage device is encrypted and made accessible only to authenticated users who provide the required user credential to a boot loader. Legacy x86-based processor architectures relied primarily on a basic input/output system (BIOS) to initiate platform hardware and initiate loading of the operating system (OS) for the system. As a part of this process, an INT13 (i.e., Interrupt 13) BIOS interface can access an Option ROM, which typically consists of firmware that is called by the system BIOS. For example, an adapter card that controls a boot device can contain firmware that is used to connect the device to the system once the Option ROM is loaded. INT13 hooking is provided in a legacy boot type BIOS Compatibility Support Module (CSM). In this implementation, the legacy boot BIOS utilizes an integrated Option ROM (OROM) to intercept the read and write access to the drive, and perform the encrypt/decrypt operations on the drive.

Due to certain limitations in the BIOS architecture, original equipment manufacturers (OEMs) have developed a new specification, the Extensible Firmware Interface (EFI), and later the Unified EFI (UEFI), for managing the pre-boot environment after the platform is powered on and before the OS is loaded. The UEFI specification describes a platform initialization (PI) phase, or pre-boot phase, and the interface between the operating system and the system firmware. To this end, the UEFI specification provides guidelines for drivers that provide levels of abstraction from the hardware devices of the system. These abstractions provide other UEFI drivers and applications an interface (referred to as "protocols" in UEFI) to the hardware devices managed by the driver producing the abstraction.

UEFI does not lend itself well to intercepting (hooking) the hard drive data in the same manner as the industry standard legacy "Interrupt Hooking" of the legacy BIOS. One aspect of the present disclosure thus provides for an encryption mechanism that is integrated into the firmware (BIOS) itself of the computer platform hardware, as part of an enhanced UEFI implementation. In particular, as described herein, the existing Block I/O protocol is "chained" to an Interceptor Block I/O protocol that is installed into BIOS for use when an encrypted, or partially encrypted, storage device is discovered. Thereby, the Interceptor Block I/O protocol ensures that access operations can accommodate target block addresses that are designated as encrypted on the storage device.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts, with like numerals denoting like components throughout the several views. However, it will be apparent to those skilled in the art that these concepts may be practiced without these specific details. In some instances, well known structures and components are shown in block diagram form in order to avoid obscuring such concepts.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, a personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system 100 can also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a local storage controller 145 coupled to local storage 150 within which can be stored software and one or more sets of data. As further illustrated, and in accordance with one or more embodiments, storage 150 includes data stored within one or more individually addressable blocks of storage 152. As shown, these blocks of storage 152 can include both encrypted blocks 154 and unencrypted blocks 156, to provide a partially encrypted storage. It is appreciated that the addressable blocks of storage 152 can be fully encrypted or fully unencrypted. When either fully encrypted of partially encrypted, a master boot record 158 of storage 150 can include (i) an indicator (not shown) that the storage is intended to be operated as a secure, encrypted storage as well as (ii) a high water mark 160, which identifies which addresses along the sequence of available addresses within the storage 150 have been encrypted. In at least one embodiment, storage controller 145 can include functionality of both block I/O driver 122 and interceptor block I/O driver 124 and/or support data I/O operations performed by both block I/O driver 122 and interceptor block I/O driver 124.

In the illustrative depiction of FIG. 1, local storage 150 is partially encrypted, having encrypted blocks 154 and unencrypted blocks 156. For example, a high water mark 160 can be accessed in the master boot record (MBR) 158. In this context, local storage 150, such as an optical hard drive, is being sequentially encrypted with the current state of encryption tracked by the MBR 158. However, it should be appreciated with the benefit of the present disclosure that the local storage 150 can be other types of storage devices. Alternatively or in addition, blocks of addresses that are encrypted or unencrypted can be allocated in other manners, necessitating another data structure to map such tracking.

As shown, system memory 110 can include therein a plurality of modules, including firmware (F/W) 112, UEFI platform 120, operating system (O/S) 114 and application(s) 116. According to various aspects of the disclosure, application(s) 116 include at least one application that generates block I/O commands. For purposes of the disclosure, this application is referenced and illustrated as caller 118. Additionally, to support the various functionality described herein, UEFI platform 120 includes block I/O driver 122, interceptor block I/O driver (IB I/O driver) 124, reinstall protocol interface function 126, and encryption-decryption module 128. The various software and/or firmware modules have varying functionality when their corresponding program code is executed by processor(s) 105 or other processing devices (e.g., storage controller 145) within IHS 100.

IHS 100 further includes one or more input/output (I/O) controllers 130 which support connection to and processing of signals from one or more connected input device(s) 132, such as a keyboard, mouse, touch screen, or microphone. I/O controllers 130 also support connection to and forwarding of output signals to one or more connected output device(s) 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) port, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as $I^2C$, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 170, using one or more communication protocols. Network 170 can be a local area network, wide area network, personal area network, and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

To support the encryption and decryption functions provided for herein, IHS 100 includes an encryption-decryption module 128, which is indicated as being a software component within system memory 110. However, as also illustrated, the encryption and/or decryption functions described herein can be implemented via an encryption card 180, which is shown coupled to and/or accessible by the other components via system interconnect 115.

According to one aspect of the disclosure, IHS 100 is a UEFI initialized system which performs data read/write operations using a Block I/O protocol. The UEFI accesses the hard drive (storage device) utilizing the Block I/O layer for directing read/write data along a device path to the physical drive. Each hard drive has an instantiation of the Block I/O protocol activated following discovery of the drive during the UEFI device initialization. This protocol is installed on the device handle specific to the storage device. The instance is represented by a Block I/O handle with an associated device path to the physical hardware. All read or write of the drive are processed through this layer.

As provided for herein, a primary function of IB I/O driver 124 is to intercept hard disk data access, preprocess the data associated with either an encrypt/decrypt operation using an encryption-decryption module 128, and then redirect the access to the hardware utilizing the resources of the original Block I/O driver 122. To support encryption, the Interceptor Block I/O driver (IB I/O driver) 124 installs an IB I/O encryption-decryption module 128. Following user authentication, by which the system ensures that the user has the correct credentials to access the data on the drive (storage 150), each Block I/O handle can be located using the UEFI "LocateHandleBuffer" and "HandleProtocol" functions. Once the handles are located, the IB I/O driver 124 performs an initialization operation to determine if the drive is encrypted (whether fully encrypted or partially encrypted). If local storage 150 is at least partially encrypted, an original instance of Block I/O driver 124 associated with the drive's Block I/O handle can then have its Block I/O protocol replaced with the IB I/O protocol. According to one embodiment, this replacement of the block I/O protocol can be accomplished utilizing a UEFI ReinstalProtocolInterface function 126. However, because of the way the UEFI framework manages resources, the original Block I/O driver 122 will continue to remain in system memory 110. This characteristic allows for the continued use of the original instance of the Block I/O driver 122, and a functional chaining of the Block I/O driver 122 to the IB I/O driver 124. According to the described embodiments, the IB I/O driver 124 is configured to utilize the original Block I/O driver 122 and the associated resources of the Block I/O driver 122 to complete the actual transfer of the read/write data to/from the drive (local storage 150).

Figure 2:
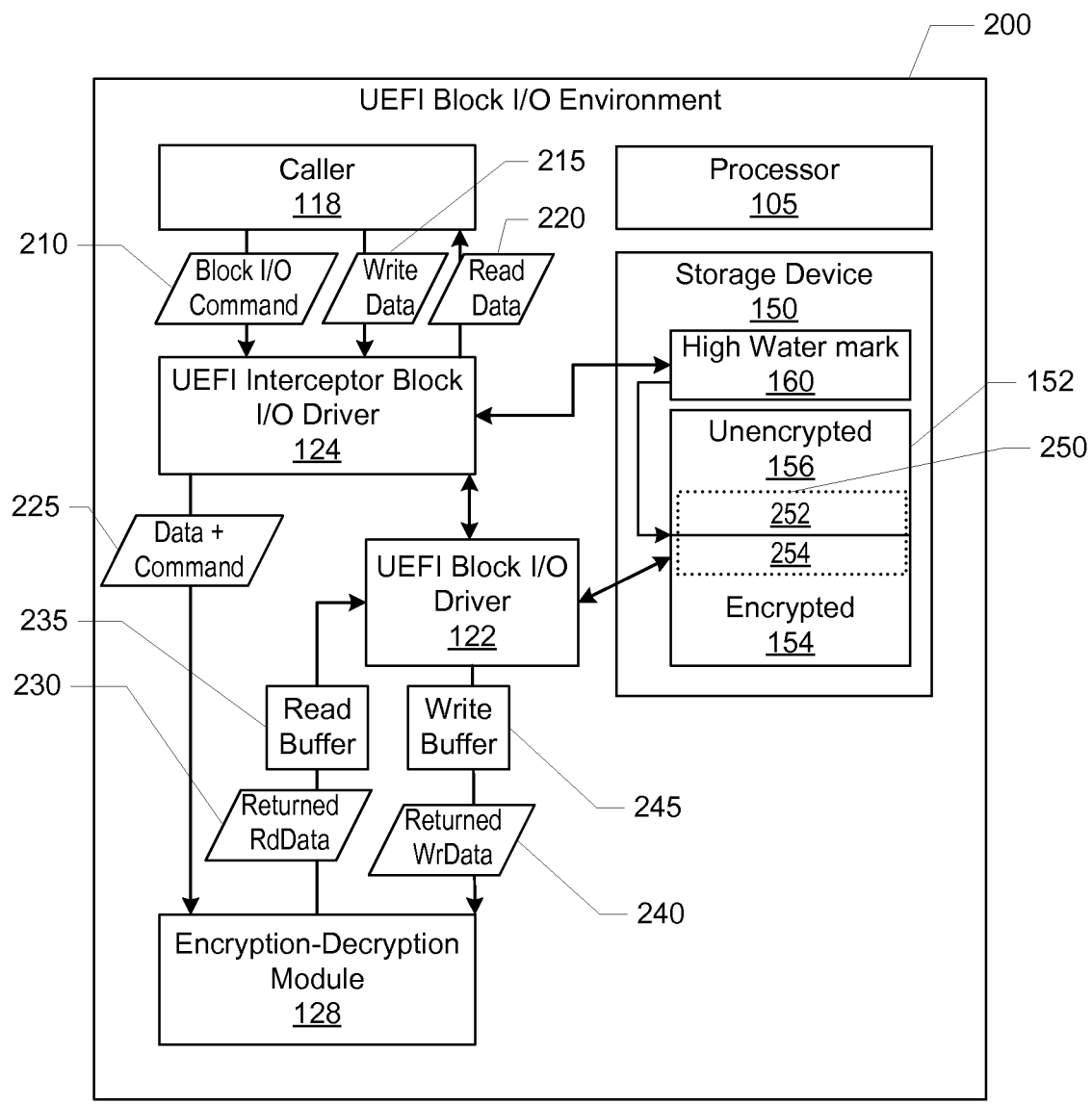
FIG. 2 illustrates a block diagram of another information handling system within which various aspects of the disclosure can be implemented, according to one or more embodiments.

FIG. 2 illustrates a block diagram representation of an example IB I/O protocol operating environment 200, which can be generally presented within information handling system (IHS) 100. Example IB I/O protocol operating environment 200 includes processor 105, which executes the various code (of caller 118, for example) that enables generation of block I/O commands as well as the code modules associated with UEFI and encryption module 128 (when software implemented). IB I/O protocol operating environment 200 includes caller 118, UEFI block I/O driver 122, UEFI interceptor block I/O driver 124, and encryption module 128. Also within IB I/O protocol operating environment 200 is storage device 150. During block I/O processing, caller 118 issues block I/O commands 210, which can include one of a read command or a write command that targets a specific one or more block addresses within storage device 150. When the block I/O command 210 is a write command, the block I/O command 210 is accompanied by or includes write data 215. When the block I/O command 210 is a read command, the block I/O command is operated on by the UEFI IB I/O driver and triggers a return to the caller 118 of read data 220.

As introduced within FIG. 1, storage device 150 includes block storage 152, divided into unencrypted storage 156 and encrypted storage 154. The address at which the block storage 152 is divided between encrypted storage and unencrypted storage is identified by a high water mark 160, which is shown as a solid line separating the storage segments. Additionally, for purposes of illustration, storage device 150 is illustrated having one or more targeted block addresses 250 (illustrated as a dashed block). Specifically, the one or more targeted block addresses 250 span and/or include both unencrypted addresses 156 and encrypted addresses 154. This spanning indicates that the data associated with the block I/O command issued by caller 118 includes unencrypted data as well as encrypted data.

With the above configuration of IB I/O protocol operating environment 200, IHS 100 and specifically processor 105 can be configured to handle encryption associated with hard drive access using the UEFI block I/O driver 122 chained to the UEFI IB I/O driver 124. In one embodiment, the UEFI IB I/O driver 124 intercepts a block I/O command 210 that targets one or more block addresses 250 on the storage device 150. The block I/O command 210 is sent to the block I/O driver 122 by the caller 118, which is unaware of the presence of the UEFI IB I/O driver 124 and thus functions normally.

The UEFI IB I/O driver 124 identifies whether any of the one or more block addresses 250 on the storage device 150 targeted by the block I/O command 210 are encrypted (i.e., located within encrypted block addresses 154) or unencrypted (i.e., located within unencrypted block addresses 156). For example, the storage device 150 can be undergoing an encryption process having a pointer data structure, depicted as a high water mark 160, which indicates a dividing point between an encrypted portion 154 of block storage 152 and an unencrypted portion 156 of block storage 152. The UEFI interceptor block I/O driver 124 responds to identifying an encrypted block address 254 among the one or more target block addresses 250 by triggering or causing an encryption-decryption module 128 to perform one of an encryption (for write data) and a decryption (for read data) of data associated with the encrypted block address 254. In an exemplary aspect, the encryption-decryption module 128 is an encryption card. The UEFI interceptor block I/O driver 124 can send processing instructions and data (shown as command/data) 225 to the encryption-decryption module 128. Encryption-decryption module 128 processes the data based on the specific command received and provides returned write data 240 that is encrypted (for writes) or returned read data 230 that is decrypted (for reads), as warranted.

For read operations, the UEFI interceptor block I/O driver 124 utilizes the UEFI Block I/O Driver 122 to read the requested data (e.g., encrypted data 254 and unencrypted data 252) for read operations. When present, the encrypted data 252 is subsequently decrypted by the encryption-decryption module 128 before the data is returned to the caller 118 as read data 220. Similarly, for write operations, the UEFI IB I/O driver 124 utilizes the UEFI Block I/O Driver 122 to write encrypted data 254 and/or unencrypted data 252 to storage device 150. Encrypted data 254 previously received as unencrypted write data 215 from the caller 118 is subsequently encrypted by the encryption-decryption module 128.

Figure 3:
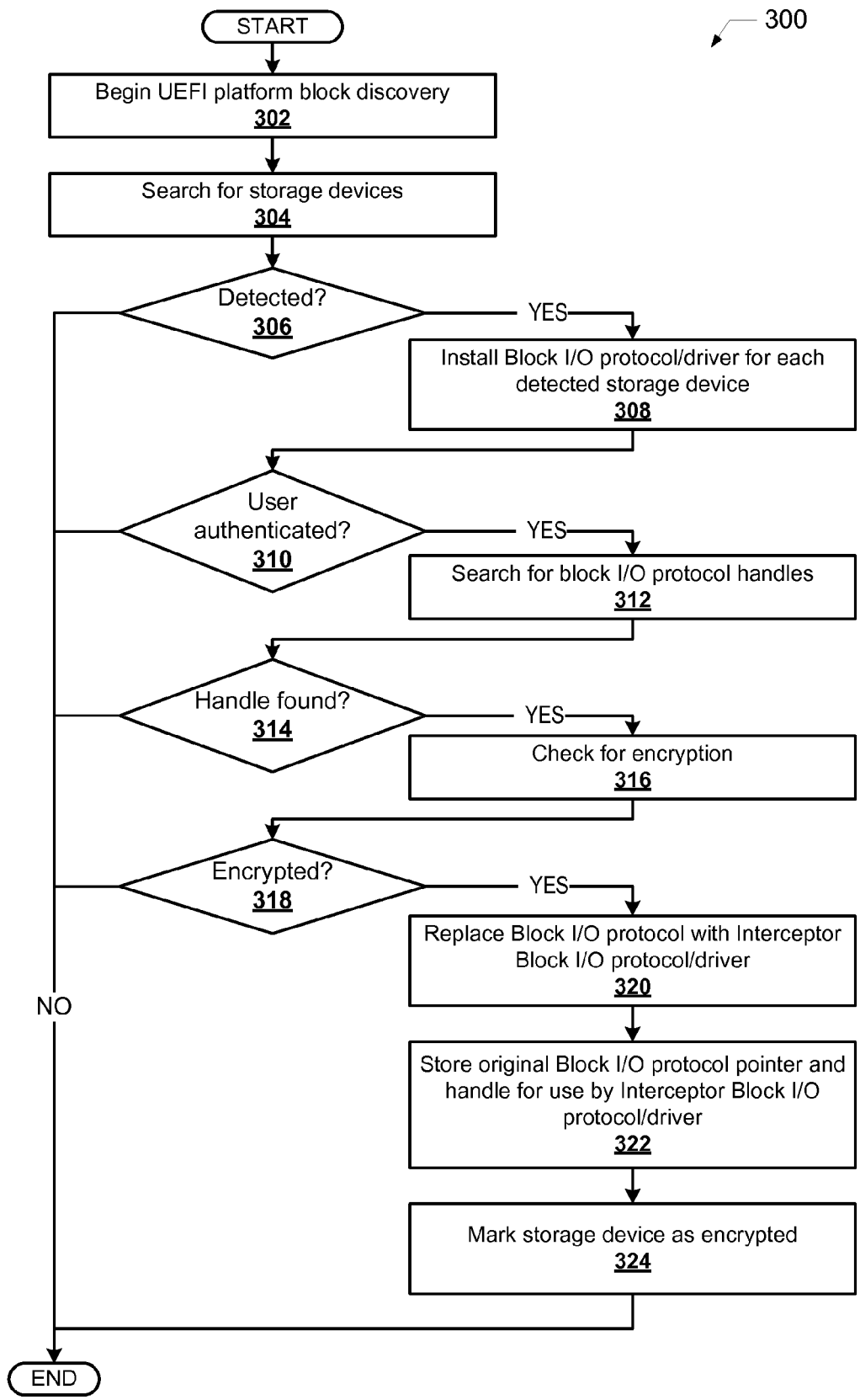
FIG. 3 illustrates a flow diagram of a method for installing an Interceptor Block Input/Output (I/O) driver for handling I/O access to encrypted storage devices in an UEFI environment, according to one or more embodiments.

With reference to FIG. 3, a method 300 is provided for initialization of an Interceptor Block I/O driver. In a particular aspect, implementation of method 300 provides for installation of the block I/O protocol during UEFI BIOS drive discovery and subsequent installation of the Interceptor block I/O driver (which accesses I/O functionality of the block I/O protocol) in response to determining that the storage device is at least partially encrypted. To that end, an information handling system (IHS), such as IHS 100 (FIG. 1), begins a UEFI BIOS drive discovery (block 302). The UEFI searches for storage devices, such as hard drives (block 304), and at decision block 306, UEFI discovery protocol determines whether a storage device is detected. If a storage device is detected, the UEFI invokes an install Block I/O protocol (block 308). The process of storage device detection and corresponding installation of block I/O protocols is repeated until there are no remaining storage devices detected. If no storage device is detected in block 306, the method 300 ends. With at least one storage device detected, a determination is made as to whether a user has been authenticated (decision block 310). If no user authentication has occurred, then method 300 ends. If user authentication has occurred at decision block 310, then UEFI implements a search for Block I/O protocol handles (block 312). A determination is made at decision block 314 whether an I/O protocol handle is found (decision block 314). If no handle is found, then method 300 ends. If the Block I/O protocol handle is found at block 314, then UEFI checks whether the storage device or drive is encrypted, partially encrypted, or configured to be encrypted (block 316). If, as determined at decision block 318, the storage device is not encrypted, then method 300 ends. However, if the storage device is determined to be an encrypted storage device, the block I/O protocol is replaced by the IB I/O protocol and drive (block 320). The original block I/O protocol pointer and handle are stored to be used by the Interceptor Block I/O protocol (block 322). UEFI tags the storage device as an encrypted storage (block 324), and then method 300 ends.

Thus, according to the above described embodiment, one aspect of method 300 includes: installing the block I/O driver during UEFI-initiated storage device discovery; and installing the interceptor block I/O driver in response to determining that a discovered storage device is at least partially encrypted, wherein the block I/O driver is chained to the interceptor block I/O driver, which also is communicatively connected to the encryption-decryption module.

Figure 4:
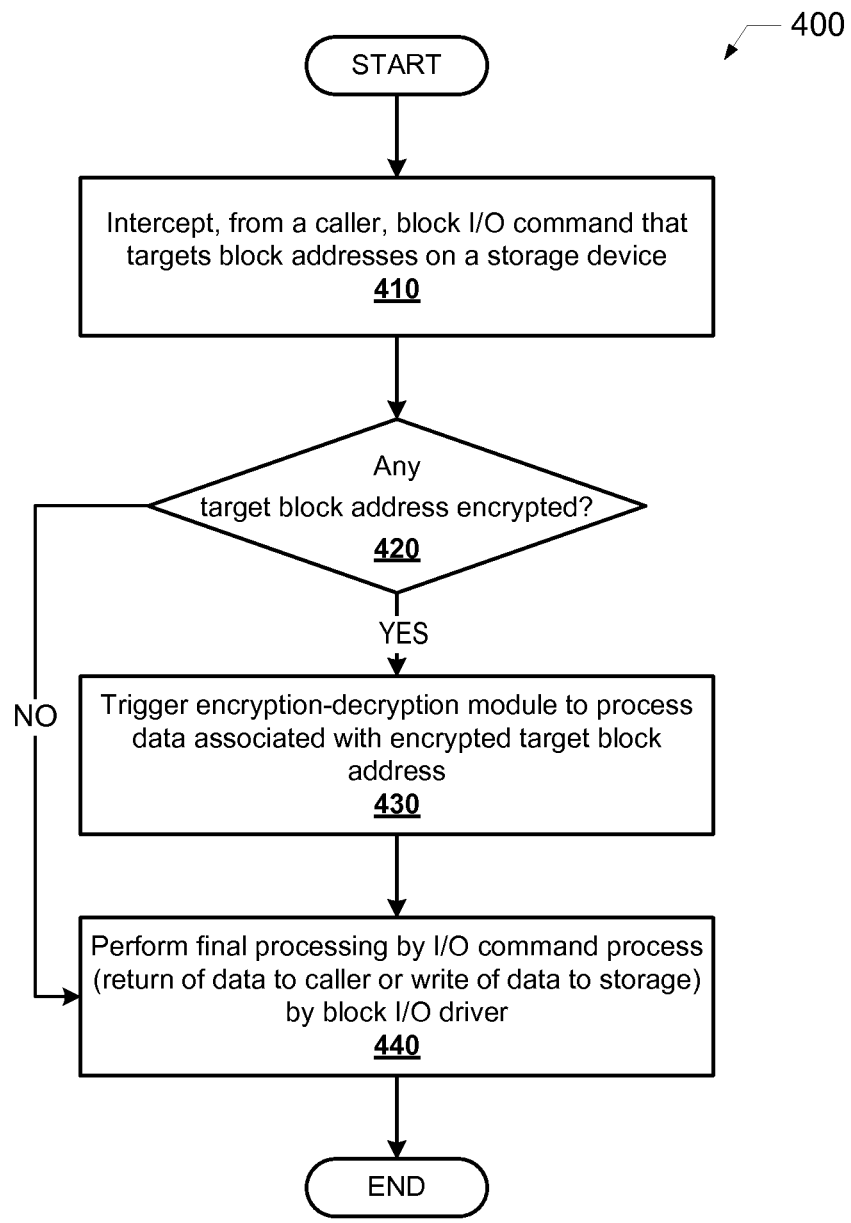
FIG. 4 illustrates a flow diagram of a method by which the Interceptor Block I/O driver performs access operations for accessing data that is stored at an encrypted address block within a storage device, according to one or more embodiments.

With reference to FIG. 4, a method 400 is provided for performing UEFI block I/O access to encrypted storage devices, such as hard drive 150, using a UEFI interceptor block I/O driver along with a block I/O driver. Method 400 can be implemented by processor execution of code associated with UEFI IB I/O driver, block I/O driver, and encryption-decryption module within IHS 100. For simplicity, method 400 is described from the perspective of processor 105 and or UEFI IB I/O driver 124, with encryption and/or decryption processes being completed by encryption-decryption module 128.

Method 400 begins at start block and proceeds to block 410, which shows UEFI interceptor block (IB) I/O driver intercepting a block I/O command for I/O access to one or more target block addresses on a storage device. In one implementation, the block I/O command is generated by a caller, which issues the command for processing by a block I/O driver. The block I/O command targets one or more block addresses on a storage device. At decision block 420, the IB I/O driver identifies whether any of the one or more target block addresses on the storage device is encrypted. In response to identifying an encrypted block address among the one or more target block addresses, method 400 includes the IB I/O driver forwarding data associated with the encrypted target block address to the encryption-decryption module to perform one of an encryption (for write data) and a decryption (for read data) of data associated with the encrypted target block address (block 430). If, as determined at decision block 420, there are no encrypted target block addresses in the target block addresses or following the completion of processing of data associated with the encrypted target block addresses, method 400 includes performing final processing of the block I/O command and associated data using the block I/O driver (block 440). The method then ends.

Thus, I/O data stored within the encrypted target block address (i.e., encrypted block addresses targeted by the block I/O command) is first identified by the UEFI interceptor block I/O driver and processed by the encryption-decryption module before the final processing (return of data or write to storage of data) of the block I/O command is performed by the block I/O driver. According to one or more embodiments, performing final handling of the block I/O commands can also include: receiving a completion signal from the encryption-decryption module that indicates that processing by the module of data associated with a targeted encrypted block address has completed; and in response to receiving the completion signal, forwarding the block I/O command along with the processed data to the block I/O driver.

Figure 5:
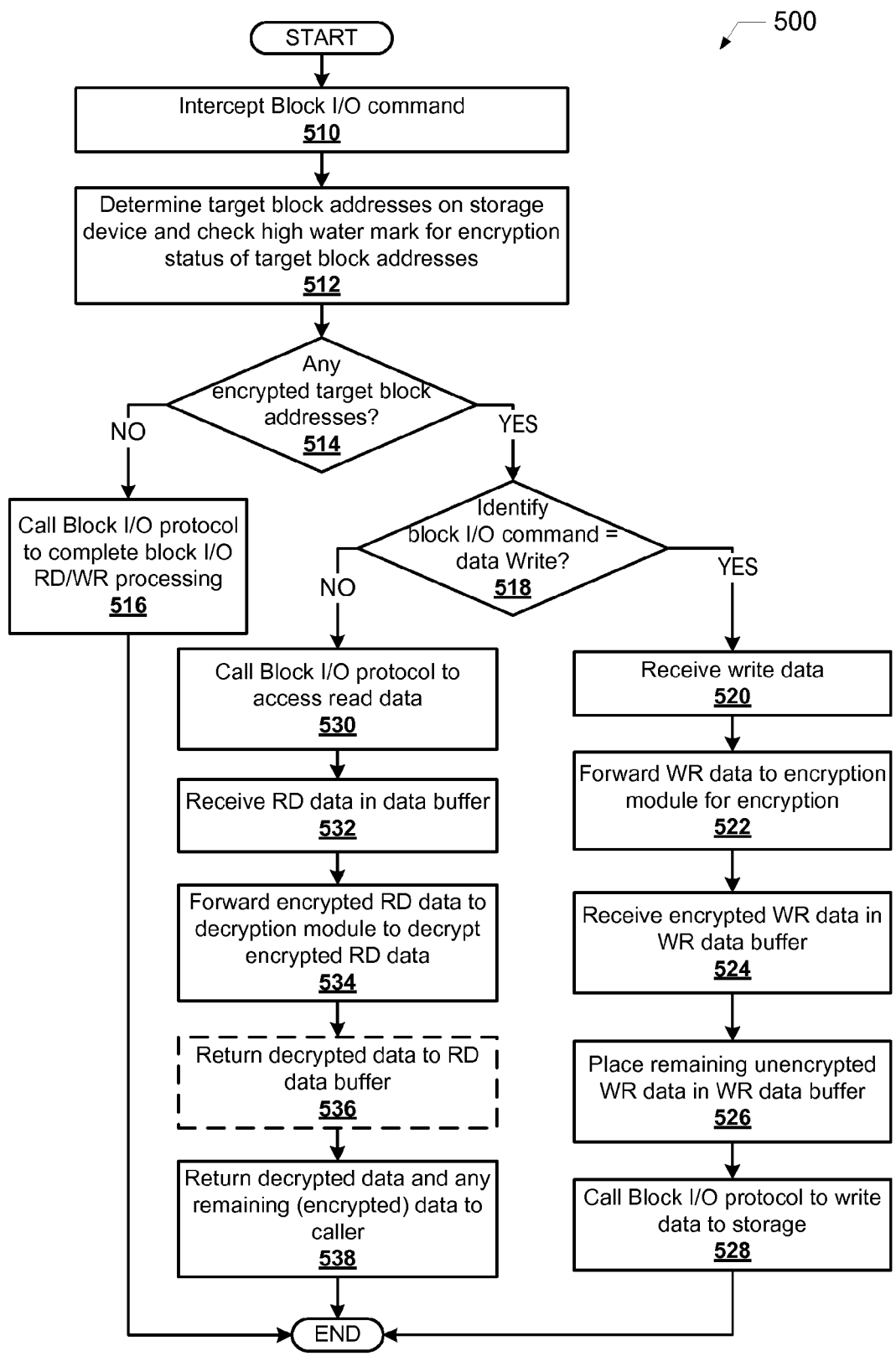
FIG. 5 illustrates a flow diagram of an exemplary method by which the Interceptor Block I/O driver performs read and/or write access operations for data being stored at a storage device that can be at least partially encrypted, according to one or more embodiments.

FIG. 5 illustrates a more specific implementation of the general method 400 of FIG. 4. In FIG. 5, the specific I/O block command is specifically identified as one of a storage device read and a storage device write access operation, according to additional aspects of the disclosure. In an exemplary aspect, the access operation corresponding to the block I/O command references block addresses that are both encrypted and unencrypted. Method 500 begins at start block and proceeds to block 510 which provides that UEFI interceptor block (IB) I/O driver intercepts a block I/O command issued by a caller. The IB I/O driver determines which block addresses on the storage device are targeted by the block I/O command and checks the high water mark to evaluate the encryption status of the target block address (block 512). At decision block 514, the IB I/O driver determines whether any of the one or more target block addresses are encrypted. As provided herein, in one embodiment, this check is determined by accessing the master boot record and reading the value of the high water mark. Thus, in at least one embodiment, the method for identifying whether any of the one or more block addresses targeted by the block I/O command is encrypted includes: accessing a high water mark record stored in a master boot record of the storage device; and comparing the block addresses targeted by the block I/O command to the high water mark.

If none of the one or more target block addresses is an encrypted target block address, then IB I/O driver forwards the block I/O command to the Block I/O protocol for processing and completion (block 516), and method 500 ends. If, however, any of the one or more target block addresses is encrypted, then IB I/O driver determines at decision block 518 whether the block I/O command is for write access to the storage device).

If the block I/O command is identified as a write command, which includes unencrypted write data, then the IB I/O driver receives write data from the caller that requires encryption (block 520). The IB I/O driver forwards the portion of the write data associated with the encrypted target block addresses along with an encryption request to the encryption-decryption module to trigger the encryption-decryption module to encrypt the unencrypted write data (block 522). In one specific embodiment, the IB I/O driver sends encryption instructions along with the unencrypted write data to an encryption card. The encryption-decryption module encrypts the received write data, and the encrypted write data is received from the encryption module (block 524). In the illustrated embodiment, the encrypted write data is placed within a write data buffer maintained by the IB I/O driver or block I/O driver. Additionally, any remaining write data of the block I/O command that is to be stored within an unencrypted block address of the storage is added to the write data buffer (block 526). Then the IB I/O driver calls/triggers the Block I/O driver to perform the final handling of the block I/O command by writing the contents of the data buffer to the one or more target block addresses. Specifically, the Block I/O driver writes the encrypted write data to the corresponding encrypted target block address and writes the remaining unencrypted write data to the corresponding unencrypted target block address (block 528).

Thus, according to at least the above described embodiment, method 500 includes: identifying the block I/O command as a write command including unencrypted write data; and in response to at least a portion of the unencrypted write data being forwarded for storage to an identified encrypted block address, triggering the encryption-decryption module to encrypt the portion of the unencrypted data that is to be stored within the identified encrypted block address to generate encrypted data. Additionally, when the block I/O command is a write command, performing final handling of the block I/O command includes: writing the encrypted data to the identified encrypted block address; and writing any remaining unencrypted data to a corresponding block address that is not an encrypted block address. Further, when a write buffer is utilized to arrange data to be written to storage by a block I/O driver, method 500 includes: placing the encrypted data within a first section of a write buffer; and placing any remaining unencrypted data within a second section of the write buffer. Then, performing final handling of the block I/O commands comprises writing all data content of the write buffer to their associated block addresses targeted by the block I/O command.

Returning to decision block 514, if the block I/O command in block 518 is not for write access, the IB I/O driver identifies the block I/O command as a read command, which would include returning read data that includes at least some encrypted read data within corresponding encrypted block addresses. The IB I/O driver first calls the Block I/O protocol to access the data stored at the one or more target block addresses (block 530). The accessed read data, which includes at least some encrypted read data, is received into a read data buffer (block 532). The IB I/O driver then forwards the encrypted read data to the encryption-decryption module for decryption of the encrypted read data (block 534). The IB I/O driver forwards the encrypted data with processing instructions to the encryption-decryption module, which decrypts the encrypted data. The decrypted read data is returned to the read buffer and placed in the read buffer along with any remaining unencrypted data returned from the block I/O command (block 536). The IB I/O driver then returns the unencrypted read data from the read buffer to the caller (block 538). Then method 500 ends.

Thus, according to another embodiment, method 500 includes: identifying the block I/O command as a read command for return of read data that includes at least some encrypted data stored within corresponding encrypted block addresses; and in response to at least a portion of the read data being encrypted data: triggering the encryption-decryption module to decrypt the encrypted data to generate unencrypted data. Method 500 then further includes performing final handling of the block I/O command by: providing the unencrypted data processed by the encryption-decryption module to a caller that issued the block I/O command; and providing any remaining read data that was not stored within an encrypted block address to the caller. In one or more embodiments, providing the unencrypted data and providing the remaining read data comprises: placing the any remaining read data within a first section of a read buffer; and placing the unencrypted data within a second section of the read buffer. Thus, performing final handling of the block I/O comments comprises forwarding the read buffer to a caller that issued the I/O block command.

In the above described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for performing Unified Extensible Firmware Interface (UEFI) block input/output (I/O) access to storage devices that can be encrypted, the method comprising:
   intercepting, by a UEFI interceptor block I/O driver, a caller-initiated block I/O command for I/O access to one or more target block addresses on a storage device;
   identifying whether any of the one or more target block addresses is for an encrypted storage block, wherein identifying includes: accessing a high water mark record stored in a master boot record of the storage device; and comparing the block addresses targeted by the block I/O command to the high water mark;
   in response to identifying an encrypted storage block among the one or more target block addresses, forwarding data associated with the encrypted target storage block to an encryption-decryption module to perform one of an encryption and a decryption of corresponding data; and
   performing final handling of the block I/O command and associated data using the block I/O driver;
   wherein I/O data stored within the encrypted storage block targeted by the block I/O command is first identified by the UEFI interceptor block I/O driver and processed by the encryption-decryption module before final handling of the block I/O command is performed by the block I/O driver.

2. The method of claim 1, further comprising:
   identifying the block I/O command as a write command including unencrypted write data; and
   in response to at least a portion of the unencrypted write data being forwarded for storage to an identified encrypted storage block, triggering the encryption-decryption module to encrypt the portion of the unencrypted data that is to be stored within the identified encrypted storage block to generate encrypted data.

3. The method of claim 2, wherein the performing final handling of the block I/O command comprises:
   writing the encrypted data to the identified encrypted storage block; and
   writing any remaining unencrypted data to a corresponding block address that is not for an encrypted storage block.

4. The method of claim 2, further comprising:
   placing the encrypted data within a first section of a write buffer; and
   placing any remaining unencrypted data within a second section of the write buffer; and
   wherein performing final handling of the block I/O commands comprises writing all data content of the write buffer to their associated block addresses targeted by the block I/O command.

5. The method of claim 1, further comprising:
   identifying the block I/O command as a read command for return of read data that includes at least some encrypted data stored within corresponding encrypted storage blocks;
   in response to at least a portion of the read data being encrypted data:
   triggering the encryption-decryption module to decrypt the encrypted data to generate unencrypted data; and
   performing final handling of the block I/O command by: providing the unencrypted data processed by the encryption-decryption module to a caller that issued the block I/O command; and providing any remaining read data that was not stored within an encrypted block address to the caller.

6. The method of claim 5, wherein providing the unencrypted data and providing the remaining read data comprises:
   placing the any remaining read data within a first section of a read buffer; and
   placing the unencrypted data within a second section of the read buffer; and
   wherein performing final handling of the block I/O comments comprises forwarding the read buffer to a caller that issued the I/O block command.

7. The method of claim 1, wherein the encryption-decryption module is an encryption-decryption card and forwarding data to the encryption-decryption module comprises forwarding the data with specific processing instructions to the encryption-decryption card.

8. The method of claim 1, further comprising installing the block I/O driver during UEFI-initiated storage device discovery.

9. The method of claim 1, further comprising installing the interceptor block I/O driver in response to determining that a discovered storage device is at least partially encrypted, wherein a block I/O driver is chained through the interceptor block I/O driver, which also is communicatively connected to the encryption-decryption module.

10. The method of claim 1, wherein performing final handling of the block I/O commands comprises:
    receiving a completion signal from the encryption-decryption module that indicates that processing by the module of data associated with a targeted encrypted block address has completed; and
    in response to receiving the completion signal, forwarding the block I/O command along with the processed data to the block I/O driver.

11. An information handling system comprising:
    a storage device;
    a memory device
    a processor communicatively coupled to the storage device and the memory device;
    an encryption-decryption module accessible to the processor; and a block input/output (I/O) driver maintained on the memory device and which can execute on the processor; and a Unified Extensible Firmware Interface (UEFI) that executes on the processor and which includes a UEFI interceptor block I/O driver that:
  intercepts a caller-initiated block I/O command for I/O access to one or more target block addresses on a storage device;
  identifies whether any of the one or more target block addresses is for an encrypted storage block, wherein the interceptor block I/O driver: accesses a high water mark record stored in a master boot record of the storage device; and compares the block addresses targeted by the block I/O command to the high water mark;
  in response to identifying an encrypted storage block among the storage accessed by the one or more target block addresses, forwards data associated with the encrypted block address to an encryption-decryption module to perform one of an encryption and a decryption of the data; and
  performs final handling of the block I/O command and associated data using the block I/O driver;
  wherein I/O data stored within the encrypted storage block targeted by the block I/O command is first identified by the UEFI interceptor block I/O driver and processed by the encryption-decryption module before final handling of the block I/O command is performed by the block I/O driver.

12. The information handling system of claim 11, wherein the interceptor block I/O driver further:
  identifies the block I/O command as a write command including unencrypted write data; and
  in response to at least a portion of the unencrypted write data being forwarded for storage to an identified encrypted storage block, triggers the encryption-decryption module to encrypt the portion of the unencrypted data that is to be stored within the identified encrypted storage block to generate encrypted data.

13. The information handling system of claim 12, wherein performing the final handling of the block I/O command comprises the block I/O driver configuring the processor to:
  write the encrypted data to the identified encrypted storage block; and
  write any remaining unencrypted data to a corresponding block address that is not an address of an encrypted storage block.

14. The information handling system of claim 12, wherein the block I/O driver:
  places the encrypted data within a first section of a write buffer;
  places any remaining unencrypted data within a second section of the write buffer; and
  performs final handling of the block I/O commands by writing all data content of the write buffer to their associated block addresses targeted by the block I/O command.

15. The information handling system of claim 11, wherein the UEFI interceptor block I/O driver further:
  identifies the block I/O command as a read command for return of read data that includes at least some encrypted data stored within corresponding encrypted block addresses; and
  in response to at least a portion of the read data being encrypted data:
    triggers the encryption-decryption module to decrypt the encrypted data to generate unencrypted data; and
    performs final handling of the block I/O command by:
      providing the unencrypted data processed by the encryption-decryption module to a caller that issued the block I/O command; and providing any remaining read data that was not stored within an encrypted storage block to the caller.

16. The information handling system of claim 15, wherein to provide the unencrypted data and provide the remaining read data comprises configuring the processor to:
  place the any remaining read data within a first section of a read buffer; and
  place the unencrypted data within a second section of the read buffer; and
  wherein to perform final handling of the block I/O comments the processor forwards the read buffer to a caller that issued the I/O block command.

17. The information handling system of claim 15, wherein the encryption-decryption module is an encryption-decryption card and forwarding data to the encryption-decryption module comprises forwarding the data with specific processing instructions to the encryption-decryption card.

18. The information handling system of claim 11, wherein:
  the UEFI interceptor block I/O driver further installs the interceptor block I/O driver in response to determining that a discovered storage device is at least partially encrypted, wherein the block I/O driver is chained through an interceptor block I/O driver, which also is communicatively connected to the encryption-decryption module.

19. The information handling system of claim 11, wherein to perform final handling of the block I/O commands the UEFI interceptor block I/O driver:
  receives a completion signal from the encryption-decryption module that indicates that processing by the module of data associated with a targeted encrypted block address has completed; and
  in response to receiving the completion signal, forwards the block I/O command along with the processed data to the block I/O driver.

\* \* \* \* \*